US011927000B2

(12) United States Patent
Wang et al.

(10) Patent No.: US 11,927,000 B2
(45) Date of Patent: Mar. 12, 2024

(54) STRUCTURE FOR PICKING AND PLACING HAND SHOWER

(71) Applicant: Xiamen Lota International Co., Ltd., Fujian (CN)

(72) Inventors: Xuedong Wang, Fujian (CN); Jinyong Chen, Fujian (CN); Xiaofei Guo, Fujian (CN); Chuanbao Zhu, Fujian (CN)

(73) Assignee: Xiamen Lota International Co., Ltd., Fujian (CN)

( * ) Notice: Subject to any disclaimer, the term of this patent is extended or adjusted under 35 U.S.C. 154(b) by 88 days.

(21) Appl. No.: 17/698,380

(22) Filed: Mar. 18, 2022

(65) Prior Publication Data

US 2023/0257974 A1 Aug. 17, 2023

(30) Foreign Application Priority Data

Feb. 15, 2022 (CN) ......................... 202220305383.3

(51) Int. Cl.
*E03C 1/04* (2006.01)
*B05B 15/62* (2018.01)

(52) U.S. Cl.
CPC ............ *E03C 1/0408* (2013.01); *B05B 15/62* (2018.02)

(58) Field of Classification Search
CPC ......... E03C 1/0408; E03C 1/06; B05B 15/62; B05B 1/18; B05B 15/654; F16L 27/04
See application file for complete search history.

(56) References Cited

U.S. PATENT DOCUMENTS

2020/0360955 A1 * 11/2020 Huang .................... B05B 15/68

FOREIGN PATENT DOCUMENTS

CN 211099636 U 7/2020

* cited by examiner

*Primary Examiner* — Qingzhang Zhou
*Assistant Examiner* — Joel Zhou
(74) *Attorney, Agent, or Firm* — Cooper Legal Group LLC

(57) ABSTRACT

The present disclosure discloses a structure for rapidly picking and placing a hand shower comprising a fixed portion, a shower body, and a trigger element. The fixed portion is movably disposed with a locking member, and the shower body is disposed with a locking matching portion. When the locking matching portion is locked to and matched with the locking member, the shower body is fixed relative to the fixed portion. The trigger element is movably disposed on the shower body. When the shower body is fixed relative to the fixed portion, the trigger element contacts the locking member, and movement of the trigger element is configured to drive the locking member to move to enable the locking member to be separated from the locking matching portion and to enable the shower body to be rapidly separated from the fixed portion.

9 Claims, 9 Drawing Sheets

STRUCTURE FOR PICKING AND PLACING HAND SHOWER

RELATED APPLICATIONS

This application claims priority to Chinese patent application number 202220305383.3, filed on Feb. 15, 2022. Chinese patent application number 202220305383.3 is incorporated herein by reference.

FIELD OF THE DISCLOSURE

The present disclosure relates to a structure for rapidly picking and placing a hand shower.

BACKGROUND OF THE DISCLOSURE

The existing structure for picking and placing a hand shower includes a slot and the hand shower. The hand shower includes a head portion and a handheld portion fixed on the head portion, and the handheld portion is inserted into the slot to realize hooking. The existing structure for picking and placing the hand shower has the following shortcomings. First, the handheld portion is inserted into the slot, and there is a problem of not being properly inserted or held in place. Due to a position of a support device being relatively high, it is not easy for a user to intuitively check whether the handheld portion is properly inserted into the slot and held in place when inserting the hand shower, so that the hand shower easily falls off and causes an accident. Or, when the handheld portion is inserted too deeply into the slot, the hand shower needs to be pulled out with both hands when pulling the hand shower out of the slot, which is laborious. Second, the hand shower is easy to shake when inserted into the slot, and it is easy for the user to misuse the hand shower, causing the hand shower fall off.

For example, Chinese patent application number 201920872147.8 discloses a hook-up structure of a hand shower, which includes a support device and a hand shower. The support device and the hand shower respectively includes a connecting member and a connecting matching member detachably coupled to the connecting member. The connecting member and the connecting matching member respectively include mechanisms parallel to one another, and the support device and the hand shower also have a positioning member and a positioning matching member to fix the connecting member in the connecting matching member. The positioning member is an elastic positioning pin, and the positioning matching member is a positioning hole. Therefore, when positioning the hand shower, the elastic positioning pin needs to be accurately aligned with a position of the positioning hole to be hooked into position, which is still inconvenient to operate.

BRIEF SUMMARY OF THE DISCLOSURE

The present disclosure provides a structure for rapidly picking and placing a hand shower to solve the deficiencies in the background.

In order to solve the technical problem, a first technical solution of the present disclosure is as follows.

A structure for rapidly picking and placing a hand shower comprises a fixed portion, a shower body, and a trigger element. The fixed portion is movably disposed with a locking member, and the shower body is disposed with a locking matching portion. When the locking matching portion is locked to and matched with the locking member, the shower body is fixed relative to the fixed portion. The trigger element is movably disposed on the shower body. When the shower body is fixed relative to the fixed portion, the trigger element contacts the locking member, and movement of the trigger element is configured to drive the locking member to move to enable the locking member to be separated from the locking matching portion and to enable the shower body to be rapidly separated from the fixed portion.

In a preferred embodiment, the fixed portion comprises a protruding end having a cavity defined inside of the protruding end, the locking member is movably disposed in the cavity, the shower body comprises an accommodating cavity having a top opening, the locking matching portion is disposed in the accommodating cavity, and the protruding end is configured to be disposed in the accommodating cavity.

In a preferred embodiment, the shower body comprises an installing cavity in communication with the accommodating cavity, and the trigger element is movably disposed in the installing cavity. When the trigger element is in an initial state, a distal end of the trigger element is flush with a bottom wall of the accommodating cavity.

In a preferred embodiment, the accommodating cavity and the installing cavity are arranged along an up-and-down direction and are located in a center of the shower body.

In a preferred embodiment, the locking member comprises a guiding block and one or more sliding buckles, the guiding block is movably disposed in the cavity along an up-and-down direction, the guiding block protrudes out of the cavity to contact the trigger element, the one or more sliding buckles are operatively coupled to the guiding block, the one or more sliding buckles is configured to slide between a protruding position at which the one or more sliding buckles extend transversely out of the cavity and a retracted position at which the one or more sliding buckles retract back into the cavity, and the locking matching portion is a locking slot arranged transversely. When the one or more sliding buckles are in the protruding position, the one or more sliding buckles are configured to be locked with the locking slot. When the one or more sliding buckles are in the retracted position, the one or more sliding buckles are configured to be separated from the locking slot.

In a preferred embodiment, the locking member comprises a locking spring, the locking spring is located in the cavity, and two ends of the locking spring respectively abut the guiding block and a top end of the cavity.

In a preferred embodiment, the guiding block comprises one or more transmission grooves arranged obliquely, and each of the one or more sliding buckles comprises a transmission matching block arranged obliquely and coupled operatively to a corresponding one of the one or more transmission grooves.

In a preferred embodiment, the trigger element comprises a trigger button and a trigger spring, the trigger button is movably disposed in the installing cavity, the trigger spring is located in the installing cavity, and two ends of the trigger spring respectively abut the trigger button and a cavity wall of the installing cavity.

In a preferred embodiment, the fixed portion comprises a shower support arm fixed on a wall surface, and the protruding end is fixedly connected to a distal end of the shower support arm.

In a preferred embodiment, the fixed portion comprises a shower support arm fixed on a wall surface and a water passing body fixed at a distal end of the shower support arm, the water passing body comprises a water inlet and a water outlet, the shower support arm comprises a water inlet channel in communication with the water inlet, the shower body is in communication with the water outlet, and the protruding end is fixedly connected to the water passing body.

Compared with the existing techniques, the technical solution has the following advantages.

1. The structure for rapidly picking and placing the hand shower enables the shower body to be fixed relative to the fixed part through the locking matching portion and the locking member, and the movement of the trigger element drives the locking member to move to enable the locking member and the locking matching portion to be rapidly separated from each other. In this way, the shower body and the fixed portion can be rapidly separated from each other, the shower body and the fixed portion can be quickly picked and placed, and there is no situation in which the shower body is not hung to the fixed portion in place. The fixing action can be completed by the locking matching portion cooperating with the locking member, without repeated alignment and repeated insertion. There is no difficulty in removing the shower body, and the shower body can be rapidly moved by simply operating the trigger element. The operation is extremely convenient. The structure for rapidly picking and placing the hand shower not only has a simple structure, but also occupies a small space and has high operational comfort and applicability.
2. By inserting the protruding end into the accommodating cavity until the locking member is engaged with the locking matching portion, the fixing of the shower body is completed. Since the protruding end and the accommodating cavity are much larger in size than the pin, it is only necessary to substantially align the protruding end with the accommodating cavity and then insert the protruding end into the accommodating cavity, so that the fixing operation of the shower body is quicker and more convenient.
3. The trigger element is movably disposed in the installing cavity. When the trigger element is in the initial state, the distal end of the trigger element is flush with the bottom wall of the accommodating cavity, which can ensure that when the shower body is in a fixed position, the trigger element and the locking member are kept in a contact state.
4. The accommodating cavity and the installing cavity are arranged along the up-and-down direction and are located in the center of the shower body, which makes an appearance of the shower body more beautiful.
5. The one or more sliding buckles can slide between the protruding position at which the one or more sliding buckles extend transversely out of the cavity and the retracted position at which the one or more sliding buckles retract back into the cavity. When the one or more sliding buckles are in the protruding position, the one or more sliding buckles can be locked with the locking slot, and when the one or more sliding buckles are in the retracted position, the one or more sliding buckles can be separated from the locking slot. The locking member has a simple and compact structure and reliable transmission.
6. The locking member also comprises the locking spring. When the locking spring is in the initial state, the locking spring can abut the guiding block to make the guiding block move downward, so as to enable the one or more sliding buckles to be in the protruding position. When the trigger element drives the guiding block to move upward, the locking spring can be compressed to generate the resetting force.
7. The two transmission grooves and the transmission matching block are inclined, so that when the guiding block moves along the up-and-down direction, the one or more sliding buckles can be driven to move between the protruding position and the retracted position, and the transmission structure is simple and stable.
8. The trigger element comprises the trigger button and the trigger spring, and the shower body can be removed by pressing the trigger button, which is convenient and fast.
9. The fixed portion can only comprise the shower support arm fixed on the wall surface, and the protruding end is fixedly connected to the distal end of the shower support arm. That is, the fixed portion only plays a fixing role.
10. The fixed portion can comprise the shower support arm fixed on the wall surface and the water passing body fixed at the distal end of the shower support arm, so that the fixed portion not only has the function of fixing the shower body, but also has the function of supplying water to the shower body.

DETAILED DESCRIPTION OF THE EMBODIMENTS

Figure 1:
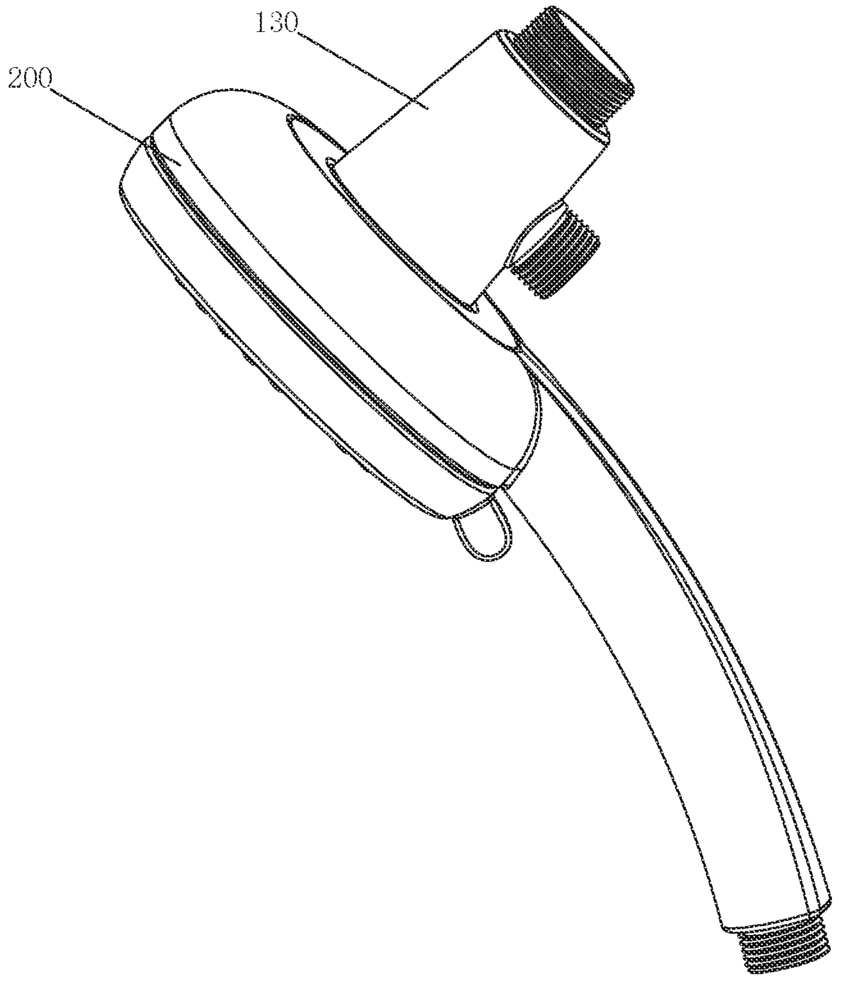
FIG. 1 illustrates an overall perspective view of a structure for picking and placing a hand shower according to a preferred embodiment when a shower body and a fixed portion are fixed to each other.

The present disclosure will be further described below in combination with the accompanying drawings and embodiments.

Unless otherwise clearly defined in the claims, specification, and the above-mentioned drawings of the disclosure, the terms "first", "second", or "third" and so on are used to distinguish different objects, not used to describe a specific order.

Unless otherwise clearly defined in the claims, specification, and the above-mentioned drawings of the disclosure, for location words, such as the use of the terms "center", "transverse", "perpendicular", "horizontal", "vertical", "top", "bottom", "inner", "outer", "upper", "lower", "front", "rear", "left", "right", "clockwise", "counterclockwise", and other indication orientations or positional relationships are based on the orientations and positional relationships shown in the drawings, are provided to facilitate the description of the disclosure and simplify the description, and are not intended to indicate or imply that the indicated device or element must have a specific orientation or be constructed and operated in a specific orientation, so cannot be understood as limiting the specific protection scope of the disclosure.

In the claims, the description, and the drawings of the present disclosure, unless otherwise explicitly defined, if the term "fixed connection" or "fixedly connected" is used, it should be understood in a broad sense. That is, any connection method without displacement relationship and relative rotation relationship between the two, that is, including non-removable fixed connection, removably fixed connection, connected as a whole, and fixed connection through other devices or components.

In the claims, the description, and the drawings of the present disclosure, the terms "including", "having", and their variations are intended to be "including but not limited to".

Referring to FIGS. 1-10, a preferred embodiment of a structure for rapidly picking and placing a hand shower is illustrated. The structure comprises a fixed portion 100, a shower body 200, and a trigger element 300.

The fixed portion 100 is movably disposed with a locking member.

In this embodiment, the fixed portion 100 comprises a protruding end 142 having a cavity 110 defined inside of the protruding end 142, and the locking member is movably disposed in the cavity 110.

Referring to FIGS. 3-9, the fixed portion 100 comprises a shower support arm 120 fixed on a wall surface and a water passing body 130 fixed at an end of the shower support arm 120, and the water passing body 130 comprises a water inlet 131 and a water outlet 132. The shower support arm 120 comprises a water inlet channel 121 configured to be in communication with the water inlet 131, and the shower body 200 is configured to be in communication with the water outlet 132. The protruding end 142 is fixedly connected to the water passing body 130. Specifically, the shower body 200 can be connected to the water outlet 132 through a hose. A T-shaped body 140 is fixed at a bottom end of the water passing body 130 through one or more screws, and a lower end of the T-shaped body 140 defines the protruding end 142. A side surface of the T-shaped body 140 comprises a through hole 141 in communication with the cavity 110, and the T-shaped body 140 is located at a center of the bottom end of the water passing body 130.

Figure 4:
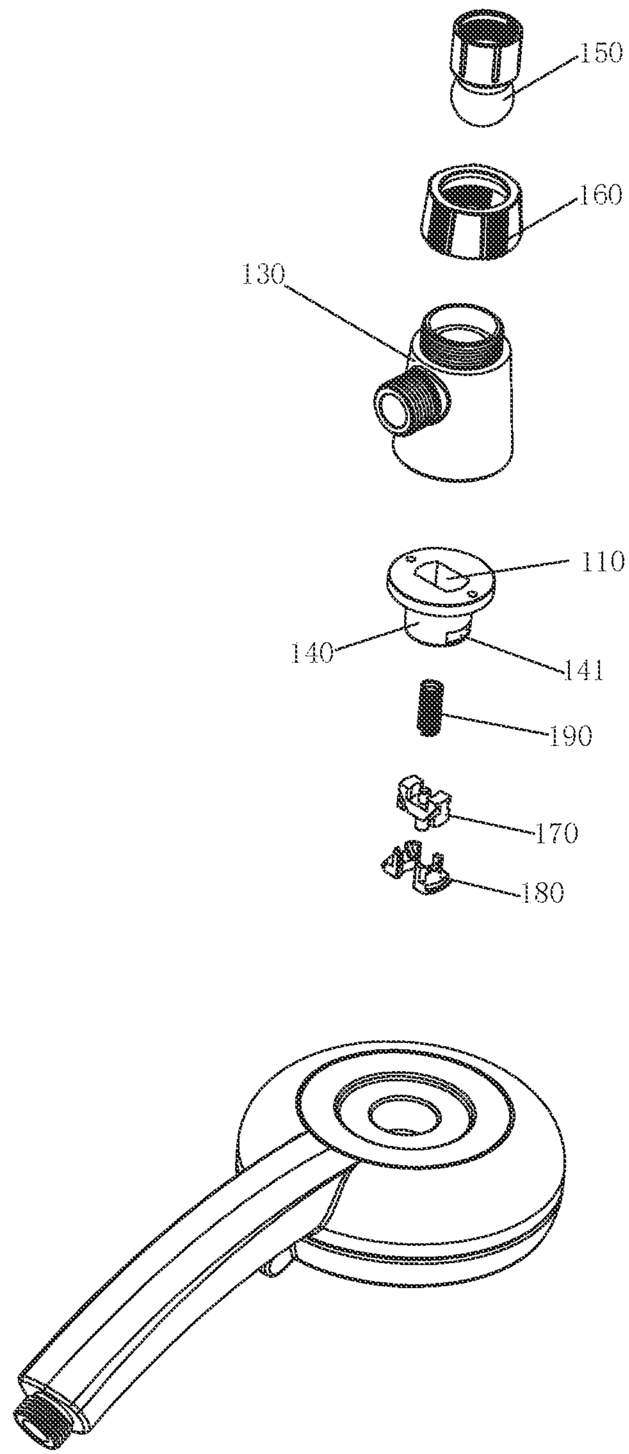
FIG. 4 illustrates a second exploded view of the structure for picking and placing the hand shower according to a preferred embodiment.

Referring to FIG. 4, the fixed portion 100 further comprises a spherical head 150 and a nut 160. The spherical head 150 is assembled with the nut 160. A top end of the spherical head 150 is screwed with the shower support arm 120, and the water passing body 130 is screwed with the nut 160. A water path is described as follow: water enters the water inlet channel 121 of the shower support arm 120, then enters the water passing body 130 from the water inlet 131 of the water passing body 130, then flows out from the water outlet 132 of the water passing body 130, and then passes through the hose to enter an inside of the shower body 200, so as to achieve a water supply for the shower body 200. It will be appreciated that the fixed portion 100 not only has a function of fixing the shower body 200 but also has a function of water supply.

In some embodiment, the fixed portion 100 may only comprise the shower support arm 120 fixed on the wall surface, and the protruding end 142 is fixedly connected to a distal end of the shower support arm 120. The shower support arm 120 only has a function of fixing the shower body 200, and does not have a function of water supply, but the disclosure is not limited thereto.

In this embodiment, the locking member comprises a guiding block 170 and one or more sliding buckles 180. The guiding block 170 is movably disposed in the cavity 110 along an up-and-down (i.e., vertical) direction and extends out of the cavity 110 to be configured to contact the trigger element 300. The one or more sliding buckles 180 are operatively coupled to the guiding block 170, and the one or more sliding buckles 180 are configured to slide between a protruding position at which the one or more sliding buckles 180 extend transversely out of the cavity 110 and a retracted position at which the one or more sliding buckles 180 retract back into the cavity 110.

In this embodiment, the locking member further comprises a locking spring 190. The locking spring 190 is located in the cavity 110, and two ends of the locking spring 190 respectively abut the guiding block 170 and a top end of the cavity 110. When the locking spring 190 is in an initial state, the locking spring 190 is configured to press the guiding block 170 to drive the guiding block 170 to move downward, so that the one or more sliding buckles 180 are in the protruding position. When the trigger element 300 drives the guiding block 170 to move upward, the locking spring 190 is compressed to generate a resetting force.

Figure 5:
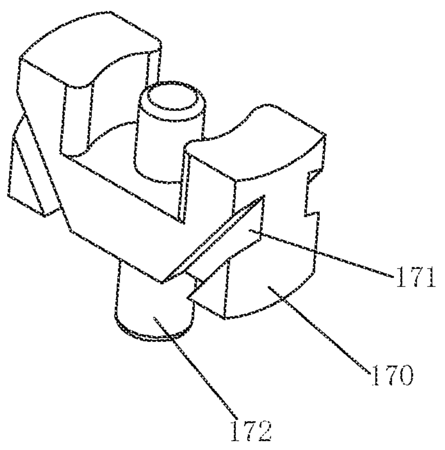
FIG. 5 illustrates a perspective view of a guiding block according to a preferred embodiment.
Figure 6:
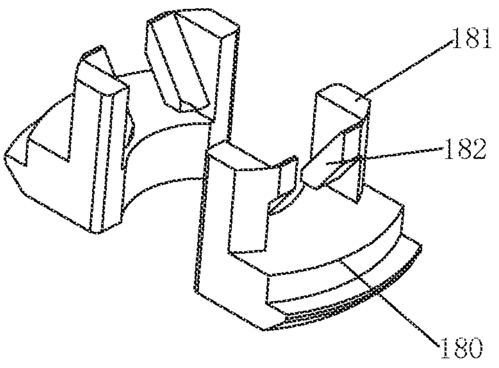
FIG. 6 illustrates a perspective view of one or more sliding buckles according to a preferred embodiment.

Specifically, referring to FIG. 5, the guiding block 170 comprises two transmission grooves 171 that are obliquely located on two sides of the guiding block 170, and the guiding block 170 comprises a guiding rod 172 located in a center axis of the guiding block 170 and extending out of the cavity 110 to correspond to a distal end of the trigger element 300. Referring to FIG. 6, the one or more sliding buckles 180 are two sliding buckles 180 spaced apart from each other along a left-and-right (i.e., lateral) direction, and each of the two sliding buckles 180 comprises two supporting rods 181 spaced apart from each other. An inner side of each of the two supporting rods 181 comprises a transmission matching block 182, which is arranged obliquely and is operatively coupled to a corresponding one of the two transmission grooves 171. That is, when the guiding block 170 moves upward, the guiding block 170 is configured to drive the two sliding buckles 180 to move inward to the retracted position. When the guiding block 170 moves downward, the guiding block 170 is configured to drive the two sliding buckles 180 to move outward to the protruding position.

The shower body 200 comprises a locking matching portion, and the shower body 200 is fixed relative to the fixed portion 100 when the locking matching portion is locked and fitted with the locking member.

In this embodiment, the shower body 200 comprises an accommodating cavity 210 having a top opening. The locking matching portion is disposed in the accommodating cavity 210, and the protruding end 142 is configured to be inserted into the accommodating cavity 210. Specifically, the locking matching portion is a locking slot 220 arranged transversely and adjacent to a bottom end of the accommodating cavity 210, and the one or more sliding buckles 180 are configured be locked with the locking slot 220 when the one or more sliding buckles 180 are in the protruding position. When the one or more sliding buckles 180 are in the retracted position, the one or more sliding buckles 180 are configured to be separated from the locking slot 220.

In this embodiment, the shower body 200 further comprises an installing cavity 230 in communication with the accommodating cavity 210, and the trigger element 300 is movably disposed in the installing cavity 230. When the trigger element 300 is in an initial state, the distal end of the trigger element 300 is flush with a bottom wall of the accommodating cavity 210.

Figure 8:
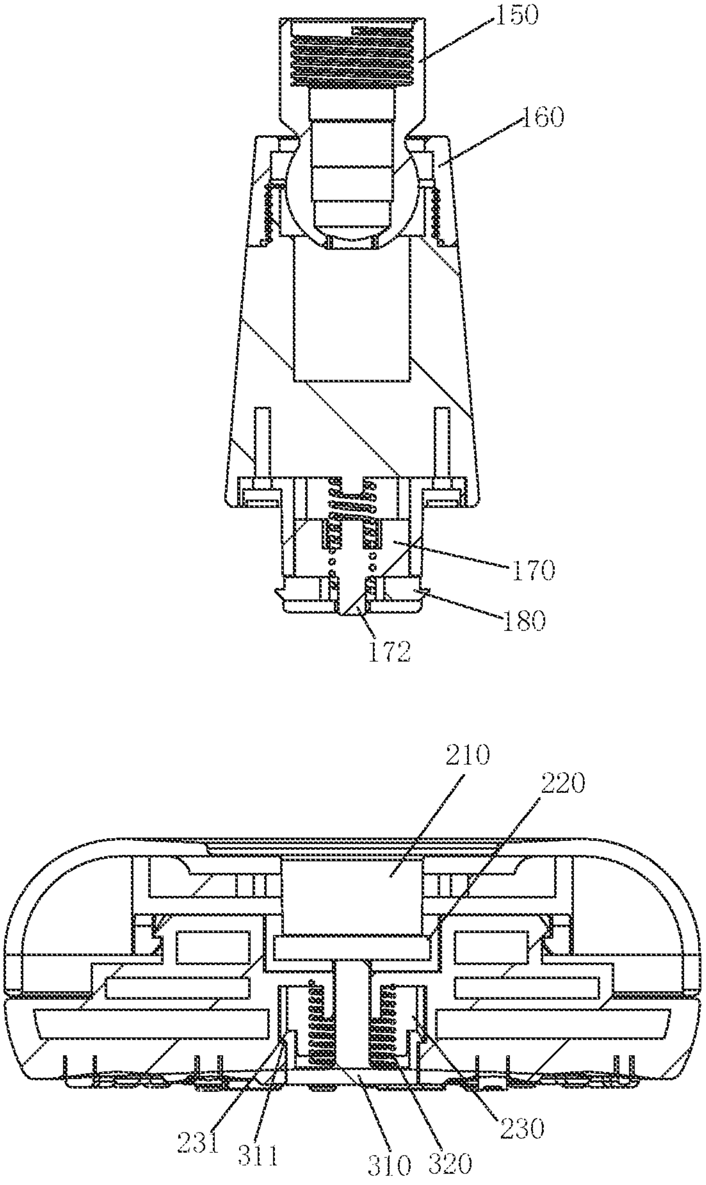
FIG. 8 illustrates a cross-sectional view of FIG. 2.

In this embodiment, referring to FIG. 8, the accommodating cavity 210 and the installing cavity 230 are arranged along the up-and-down direction and are located in a center of the shower body 200.

The trigger element 300 is movably disposed on the shower body 200. When the shower body 200 is fixed relative to the fixed portion 100, the trigger element 300 contacts the locking member and movement of the trigger element 300 drives the locking member to move to enable the locking member to be separated from the locking matching portion so that the shower body 200 is rapidly separated from the fixed portion 100.

In this embodiment, the trigger element 300 comprises a trigger button 310 and a trigger spring 320. The trigger button 310 is movably disposed in the installing cavity 230, the trigger spring 320 is located in the installing cavity 230, and two ends of the trigger spring 320 respectively abut the trigger button 310 and a cavity wall of the installing cavity 230.

Figure 7:
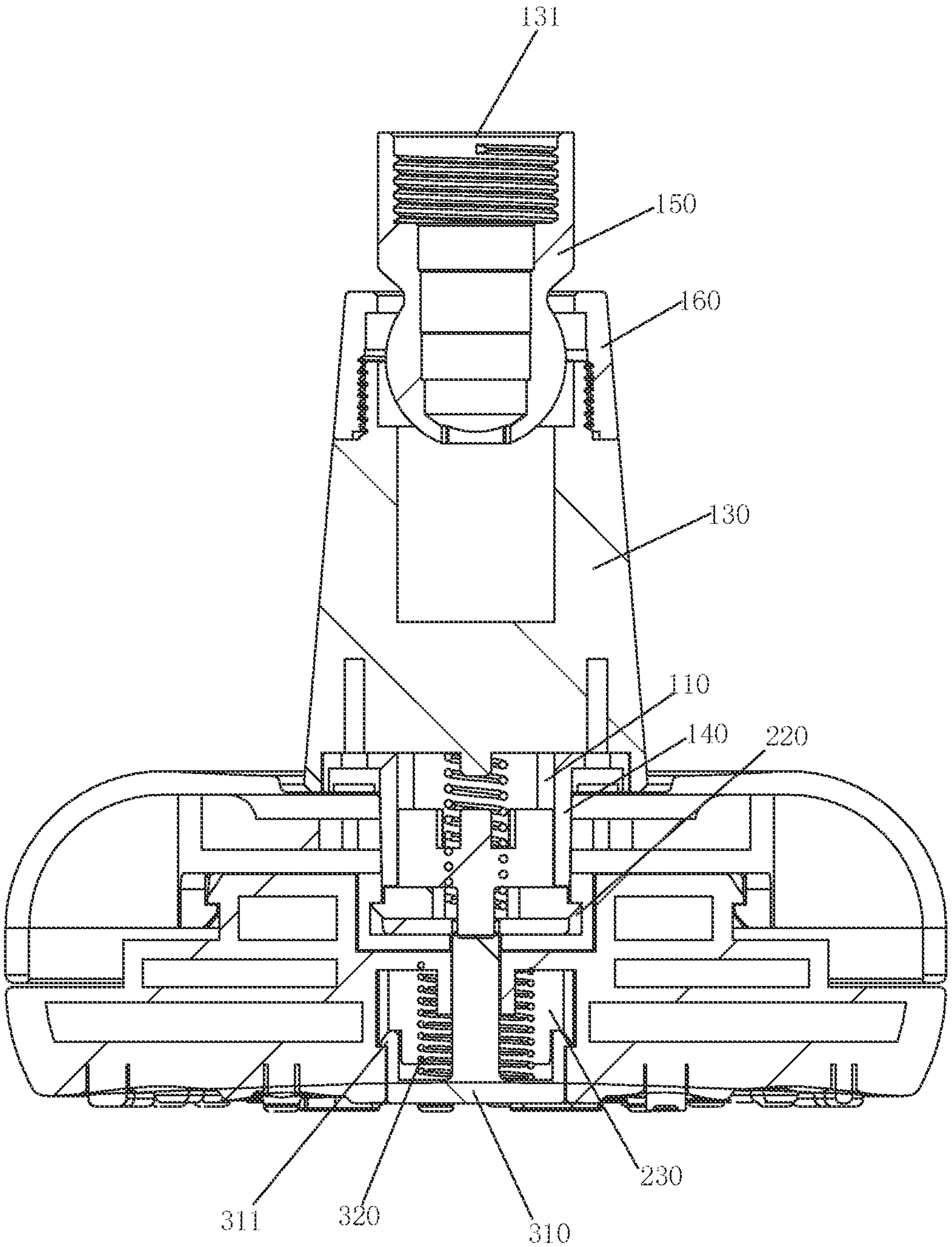
FIG. 7 illustrates a cross-sectional view of FIG. 1.

Specifically, referring to FIG. 7, an inner wall of the installing cavity 230 comprises a limiting protrusion 231, and the trigger button 310 comprises a limiting buckle 311 configured to be matched with the limiting protrusion 231 in a position-limited manner to enable the trigger button 310 to be maintained in and be prevented from being separated from the installing cavity 230.

Figure 2:
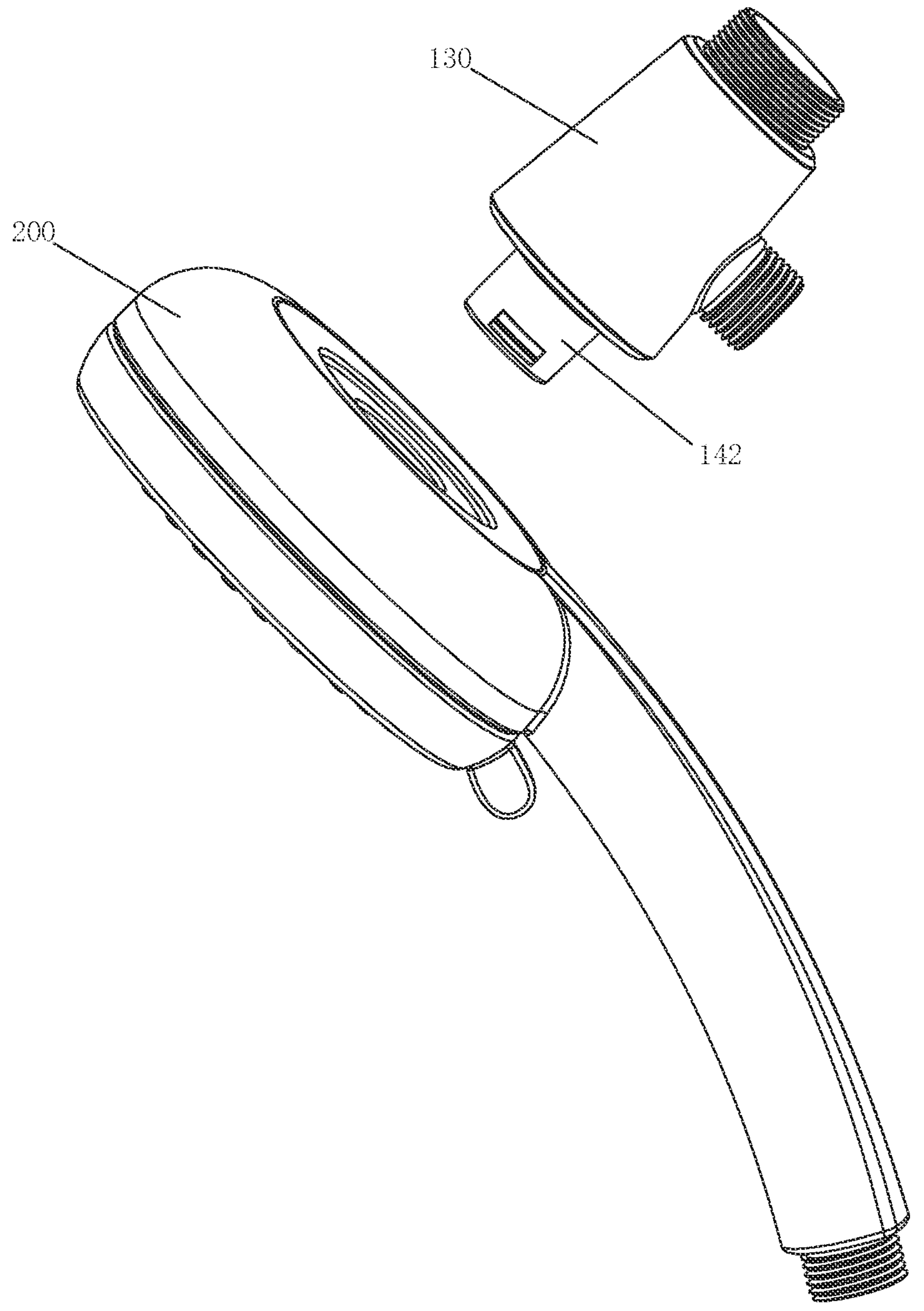
FIG. 2 illustrates an overall perspective view of the structure for picking and placing the hand shower according to a preferred embodiment when the shower body and the fixed portion are separated from each other.
Figure 3:
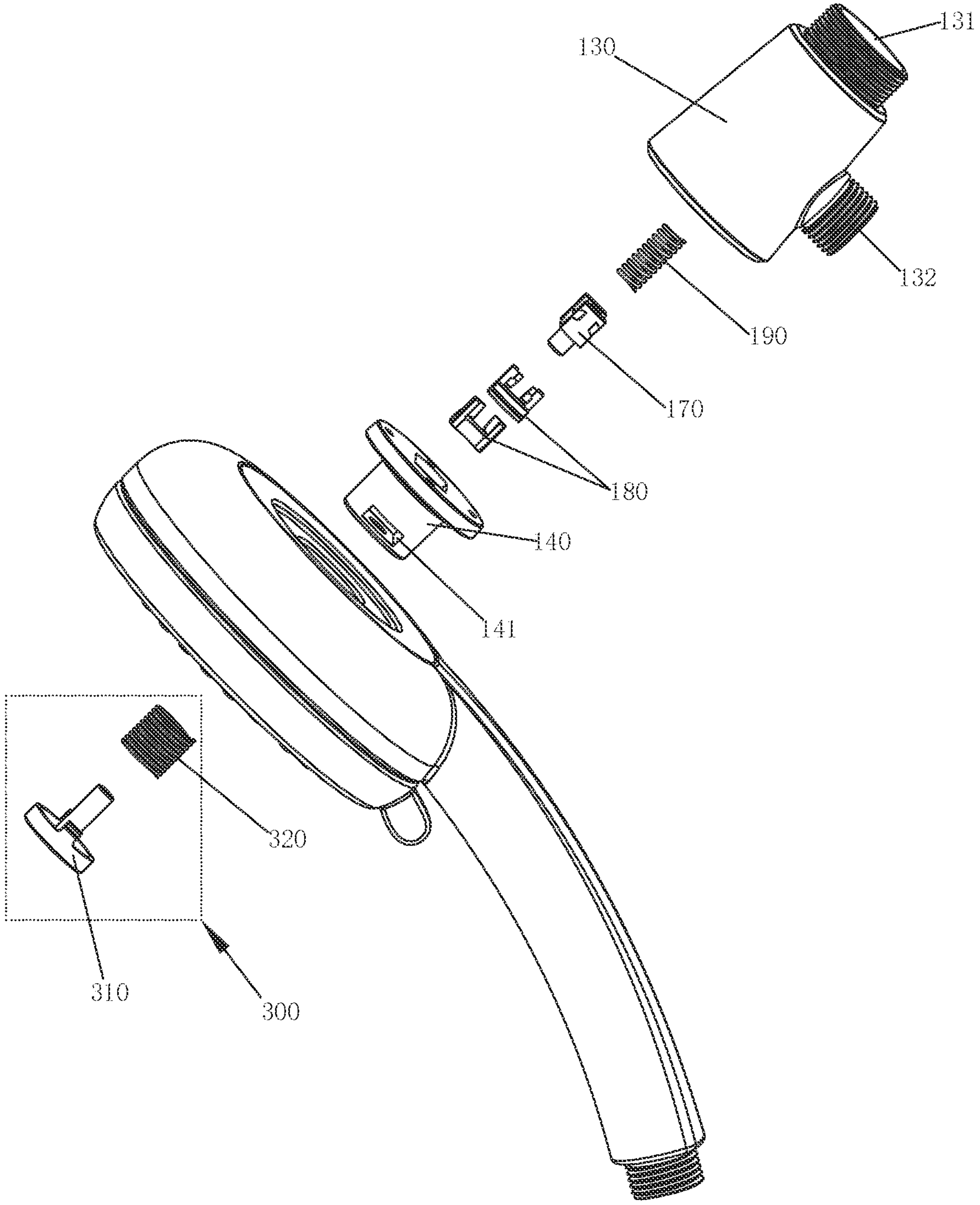
FIG. 3 illustrates a first exploded view of the structure for picking and placing the hand shower according to a preferred embodiment.
Figure 9:
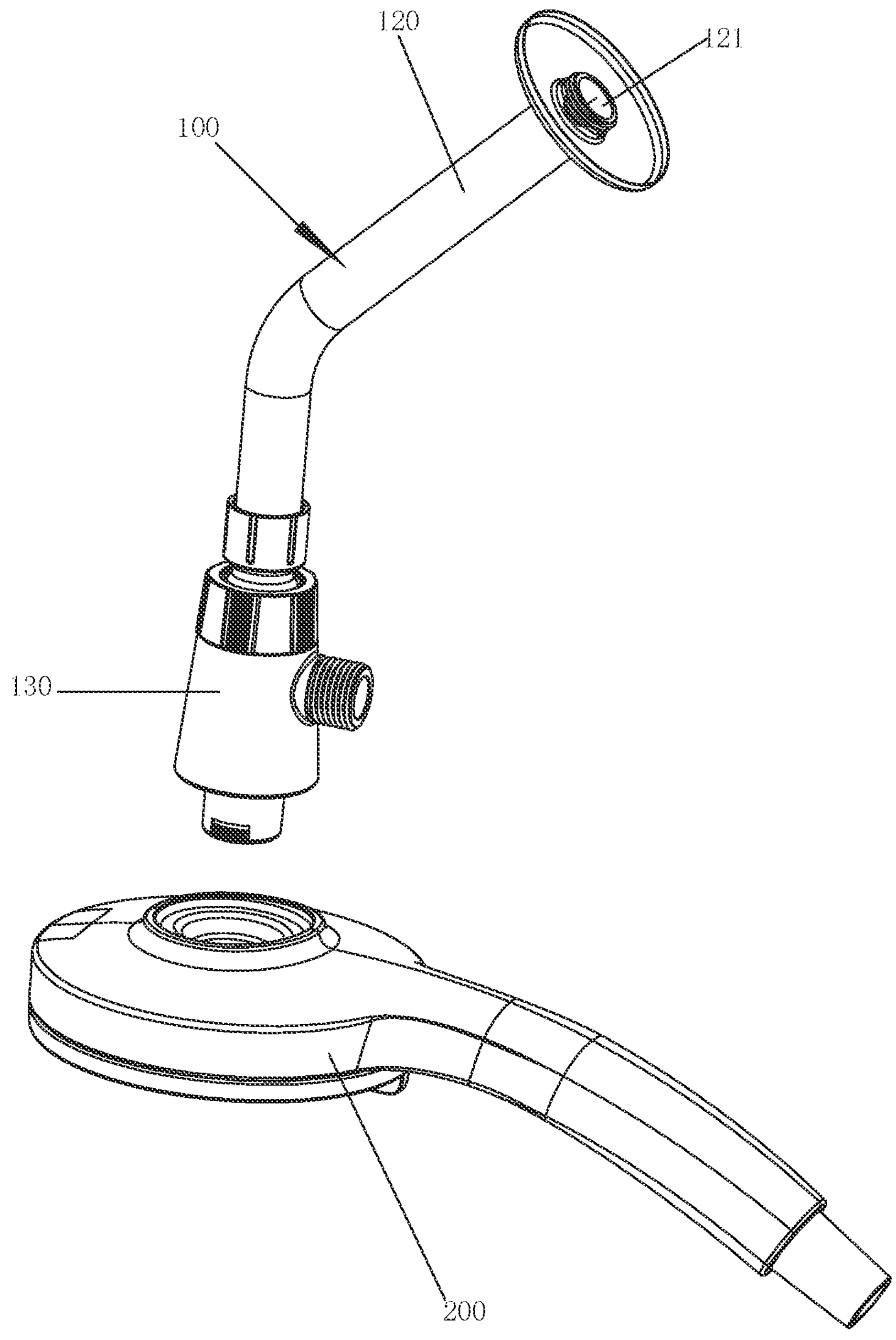
FIG. 9 illustrates a perspective view of the hand shower when the hand shower is in a first use state.
Figure 10:
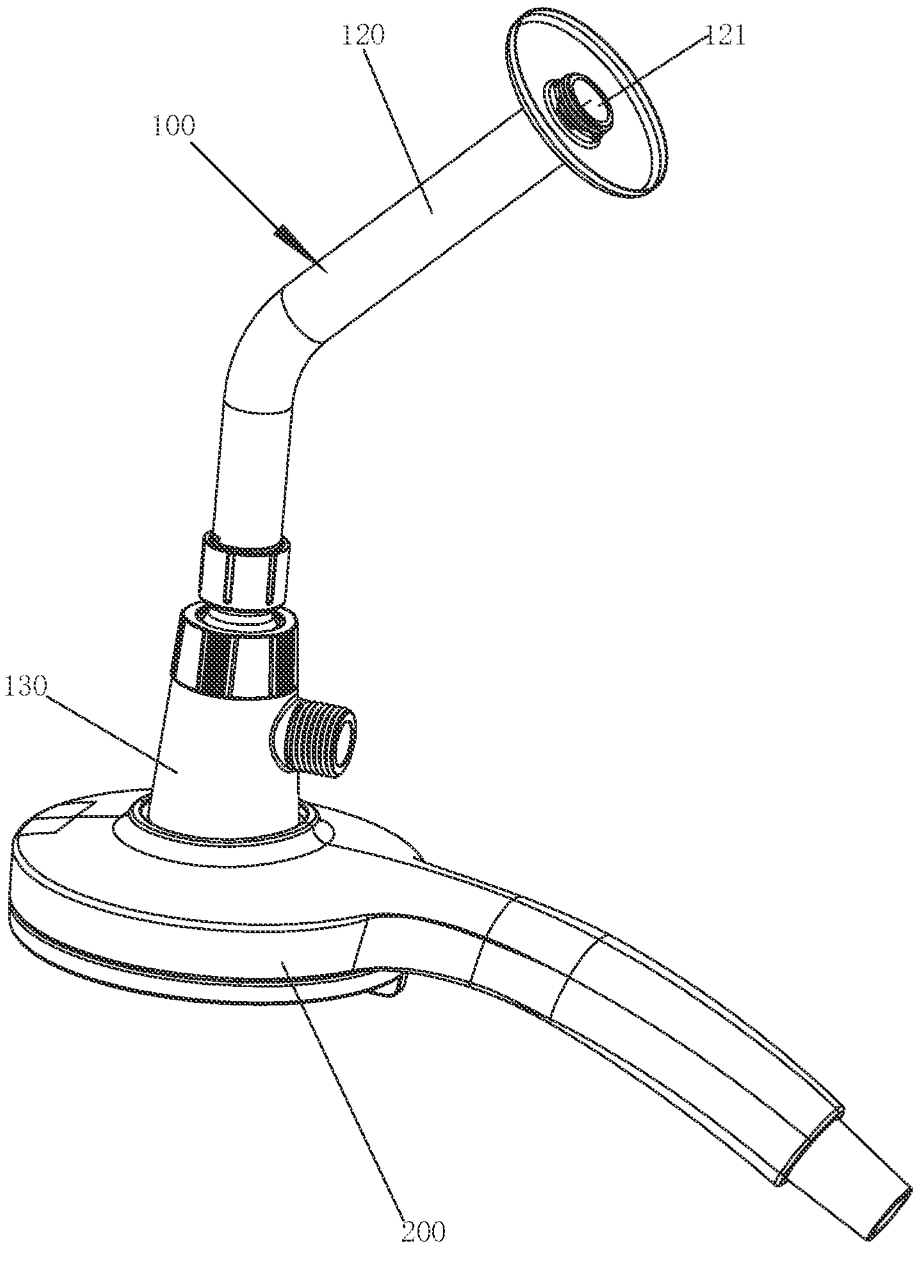
FIG. 10 illustrates a perspective view of the hand shower when the hand shower is in a second use state.

Referring to FIG. 2 and FIG. 9, the shower body 200 and the fixed portion 100 are in a separated state, and the one or more sliding buckles 180 are in the protruding position.

When the shower body 200 needs to be fixed, it is only necessary to substantially align the protruding end 142 with the accommodating cavity 210, then extend the protruding end 142 into the accommodating cavity 210, and move the shower body 200 upward to enable the one or more sliding buckles 180 to be pressed by the cavity wall of the accommodating cavity 210 to move inward to the retracted position. When the one or more sliding buckles 180 correspond to the locking slot 220, the one or more sliding buckles 180 move outward to the protruding position due to the locking spring 190 to be just locked with the locking slot 220, so that a fixing of the shower body 200 is completed. At this time, referring to FIG. 7, a bottom end surface of the guiding rod 172 just contacts a distal end of the trigger button 310. That is, when fixing the shower body 200, after the protruding end 142 and the accommodating cavity 210 are substantially aligned, the shower body 200 only needs to be pushed upward to realize the fixing. A fixing process of the shower body is extremely simple and an operation thereof is extremely convenient. Compared with a pin that is small and is hard to align to a pin hole, the alignment of the protruding end 142 and the accommodating cavity 210 is much easier, and the fixing process is extremely fast. In addition, when the one or more sliding buckles 180 are locked into the locking slot 220, there will be a clicking sound, which can remind an operator that the shower body 200 has moved in place, and has wider applicability.

When the shower body 200 needs to be picked up, it is only necessary to press the trigger button 310 upward to drive the guiding block 170 to move upward to enable the one or more sliding buckles 180 to move inward to the retracted position under a transmission action of the guiding block 170 and to be separated from the locking slot 220, so that the shower body 200 can be rapidly separated from the water passing body 130, and the shower body 200 can be picked up.

The structure for rapidly picking and placing the hand shower enables the shower body 200 to be fixed relative to the fixed portion 100 through the locking matching portion and the locking member, and the movement of the trigger element 300 drives the locking member to move to enable the locking member and the locking matching portion to be rapidly separated from each other. In this way, the shower body 200 and the fixed portion 100 can be rapidly separated from each other, the shower body 200 and the fixed portion 100 can be quickly picked and placed, and there is no situation where the shower body 200 is not hung to the fixed portion 100 in place. The fixing action can be completed by the locking matching portion cooperating with the locking member, without repeated alignment and repeated insertion. There is no difficulty in removing the shower body 200, and the shower body 200 can be rapidly moved by simply operating the trigger element 300. The operation is extremely convenient. The structure for rapidly picking and placing the hand shower not only has a simple structure, but also occupies a small space and has high operational comfort and applicability.

The aforementioned embodiments are merely some embodiments of the present disclosure, and the scope of the disclosure is not limited thereto. Thus, it is intended that the present disclosure cover any modifications and variations of the presently presented embodiments provided they are made without departing from the appended claims and the specification of the present disclosure.

What is claimed is:

1. A structure for picking and placing a hand shower, comprising:
- a fixed portion,
- a shower body, and
- a trigger element, wherein:
  - the fixed portion is movably disposed with a locking member,
  - the shower body is disposed with a locking matching portion,
  - the fixed portion comprises a protruding end having a cavity defined inside of the protruding end,
  - the locking member is movably disposed in the cavity,
  - the shower body comprises an accommodating cavity having a top opening,
  - the locking matching portion is disposed in the accommodating cavity,
  - the protruding end is configured to be disposed in the accommodating cavity,
  - the trigger element is movably disposed on the shower body,
  - when the locking matching portion is locked to and matched with the locking member, the shower body is fixed relative to the fixed portion,
  - and
  - when the shower body is fixed relative to the fixed portion:
    - the trigger element contacts the locking member, and
    - movement of the trigger element is configured to drive the locking member to move to enable the locking member to be separated from the locking matching portion and to enable the shower body to be separated from the fixed portion.

2. The structure for picking and placing the hand shower according to claim 1, wherein:

the shower body comprises an installing cavity in communication with the accommodating cavity, the trigger element is movably disposed in the installing cavity, and when the trigger element is in an initial state, a distal end of the trigger element is flush with a bottom wall of the accommodating cavity.

3. The structure for picking and placing the hand shower according to claim 2, wherein:

the accommodating cavity and the installing cavity are arranged along an up-and-down direction and are located in a center of the shower body.

4. The structure for picking and placing the hand shower according to claim 1, wherein:

the locking member comprises a guiding block and one or more sliding buckles, the guiding block is movably disposed in the cavity along an up-and-down direction, the guiding block protrudes out of the cavity to contact the trigger element, the one or more sliding buckles are operatively coupled to the guiding block, the one or more sliding buckles are configured to slide between a protruding position at which the one or more sliding buckles extend transversely out of the cavity and a retracted position at which the one or more sliding buckles retract back into the cavity, the locking matching portion is a locking slot arranged transversely, when the one or more sliding buckles are in the protruding position, the one or more sliding buckles are configured to be locked with the locking slot, and when the one or more sliding buckles are in the retracted position, the one or more sliding buckles are configured to be separated from the locking slot.

5. The structure for picking and placing the hand shower according to claim 4, wherein:

the locking member comprises a locking spring, the locking spring is located in the cavity, and two ends of the locking spring respectively abut the guiding block and a top end of the cavity.

6. The structure for picking and placing the hand shower according to claim 4, wherein:

the guiding block comprises one or more transmission grooves arranged obliquely, and each of the one or more sliding buckles comprises a transmission matching block arranged obliquely and coupled operatively to a corresponding one of the one or more transmission grooves.

7. The structure for picking and placing the hand shower according to claim 2, wherein:

the trigger element comprises a trigger button and a trigger spring, the trigger button is movably disposed in the installing cavity, the trigger spring is located in the installing cavity, and two ends of the trigger spring respectively abut the trigger button and a cavity wall of the installing cavity.

8. The structure for picking and placing the hand shower according to claim 1, wherein:

the fixed portion comprises a shower support arm fixed on a wall surface, and the protruding end is fixedly connected to a distal end of the shower support arm.

9. The structure for picking and placing the hand shower according to claim 1, wherein:

the fixed portion comprises a shower support arm fixed on a wall surface and a water passing body fixed at a distal end of the shower support arm, the water passing body comprises a water inlet and a water outlet, the shower support arm comprises a water inlet channel in communication with the water inlet, the shower body is in communication with the water outlet, and the protruding end is fixedly connected to the water passing body.

* * * * *